United States Patent
Wang et al.

(10) Patent No.: US 12,395,844 B2
(45) Date of Patent: Aug. 19, 2025

(54) COMMUNICATION METHOD AND APPARATUS

(71) Applicant: Huawei Technologies Co., Ltd., Shenzhen (CN)

(72) Inventors: Nanxin Wang, Shanghai (CN); Wenjie Peng, Shanghai (CN); Jun Wang, Shanghai (CN); Qiang Fan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 266 days.

(21) Appl. No.: 17/990,237

(22) Filed: Nov. 18, 2022

(65) Prior Publication Data
US 2023/0085378 A1 Mar. 16, 2023

Related U.S. Application Data

(63) Continuation of application No. PCT/CN2021/094751, filed on May 20, 2021.

(30) Foreign Application Priority Data

May 20, 2020 (CN) .................. 202010432218.X (51) Int. Cl.
*H04M 1/66* (2006.01)
*H04W 12/0471* (2021.01)
(Continued)

(52) U.S. Cl.
CPC ..... *H04W 12/106* (2021.01); *H04W 12/0471* (2021.01); *H04W 76/19* (2018.02)

(58) Field of Classification Search
CPC . H04W 12/04; H04W 12/0471; H04W 12/06; H04W 12/069
See application file for complete search history.

(56) References Cited

U.S. PATENT DOCUMENTS

| 12,004,029 B2 * | 6/2024 | Kim ................... H04W 76/34 |
| 2018/0295516 A1 * | 10/2018 | Chen ................... H04L 9/0861 |

(Continued)

FOREIGN PATENT DOCUMENTS

| CN | 105589506 A | 5/2016 |
| CN | 110651491 A | 1/2020 |

OTHER PUBLICATIONS

"3rd Generation Partnership Project; Technical Specification Group Services and System Aspects; Architecture enhancements for 5G System (5GS) to support Vehicle-to-Everything (V2X) services (Release 16)," 3GPP TS 23.287 V16.2.0, Mar. 2020, 53 pages.

(Continued)

*Primary Examiner* — Shantell L Heiber
(74) *Attorney, Agent, or Firm* — Slater Matsil, LLP (57) ABSTRACT

Embodiments of this application provide a communication method and apparatus. The method includes: A first terminal performs integrity protection verification on a received RRC message; and when the integrity protection verification fails, an RRC layer of the first terminal sends a first indication and an identifier of a second terminal to an application layer of the first terminal, where the first indication and the identifier of the second terminal are used by the application layer to disconnect a unicast connection between the first terminal and the second terminal. Based on this solution, when the integrity protection verification performed by the first terminal on the received message fails, the RRC layer of the first terminal may report the first indication and the identifier of the second terminal to the application layer, to trigger the application layer to disconnect the unicast connection between the first terminal and the second terminal.

19 Claims, 4 Drawing Sheets

(51) Int. Cl.
*H04W 12/106* (2021.01)
*H04W 76/19* (2018.01)

(56) References Cited

U.S. PATENT DOCUMENTS

| | | | |
|---|---|---|---|
| 2019/0068559 A1* | 2/2019 | Bamidi | H04L 9/3242 |
| 2020/0107268 A1* | 4/2020 | Lee | H04W 72/1268 |
| 2020/0120491 A1* | 4/2020 | Mildh | H04W 76/27 |
| 2020/0162435 A1* | 5/2020 | Kubo | A61B 5/112 |
| 2020/0205003 A1* | 6/2020 | Ingale | H04W 12/04 |
| 2020/0245394 A1* | 7/2020 | Wu | H04W 76/11 |
| 2021/0377238 A1* | 12/2021 | Sloane | H04L 63/123 |

OTHER PUBLICATIONS

"3rd Generation Partnership Project; Technical Specification Group Services and System Aspects; Proximity-based Services (ProSe); Security aspects (Release 15)," 3GPP TS 33.303 V15.0.0, Jun. 2018, 90 pages.

"3rd Generation Partnership Project; Technical Specification Group Radio Access Network; Evolved Universal Terrestrial Radio Access (E-UTRA); Radio Resource Control (RRC); Protocol specification (Release 16)," 3GPP TS 36.331 V16.0.0, Mar. 2020, 1048 pages.

"3rd Generation Partnership Project; Technical Specification Group Radio Access Network; NR; Packet Data Convergence Protocol (PDCP) specification (Release 16)," 3GPP TS 38.323 V16.0.0, Mar. 2020, 37 pages.

"3rd Generation Partnership Project; Technical Specification Group Radio Access Network; NR; Radio Resource Control (RRC) protocol specification (Release 16)," 3GPP TS 38.331 V16.0.0, Mar. 2020, 835 pages.

"Considerations on RLM for NR V2X unicast," Agenda Item: 11.4.5, Source: Huawei, HiSilicon, Document for. Discussion and Decision, 3GPP TSG-RAN WG2 Meeting#106, R2-1907419, (revision of R2-1904876), Reno, USA, May 13-17, 2019, 4 pages.

"Summary of offline discussion for PDCP remaining issues (CATT)," Source: CATT (rapporteur), Agenda Item: 6.4.3.2, Document for: Discussion and Decision, 3GPP TSG-RAN WG2 Meeting #109bis-e, R2-2004078, Electronic, Apr. 20-Apr. 30, 2020, 22 pages.

"PC5 unicast link handling regarding RLF," Source to WG: LG Electronics, Ericsson, Source to ISG: SA2, Work itemcode: eV2XARC, Date: Nov. 1, 2019, Category: F, Release: Rel-16, Change Request, 23.287, CR 0050, rev, Current version: 16.0.0, 3GPP TSG-SA WG2 Meeting #136, S2-1911373 (revision of S2-19xxxxx), Reno, USA, Nov. 18-22, 2019, 3 pages.

CATT (Rapporteur): "Summary of Email discussion [108#102] [V2X] Remaining issues on PDCP", 3GPP Draft; R2-2000214, Feb. 24-Mar. 6, 2020, XP052355399, total 20 pages.

CATT (Rapporteur): "Summary of offline discussion for PDCP remaining issues (CATT)", 3GPP Draft; R2-2004078, Apr. 20-30, 2020, XP051879347, total 22 pages.

* cited by examiner

COMMUNICATION METHOD AND APPARATUS

CROSS-REFERENCE TO RELATED APPLICATIONS

This application is a continuation of International Application No. PCT/CN2021/094751, filed on May 20, 2021, which claims priority to Chinese Patent Application No. 202010432218.X, filed on May 20, 2020. The disclosures of the aforementioned applications are incorporated herein by reference in their entireties.

TECHNICAL FIELD

Embodiments of this application relate to the field of communication technologies, and in particular, to a communication method and apparatus.

BACKGROUND

Vehicle to everything (V2X) is a key technology in an intelligent transportation system, and is considered to be one of fields that have the most industry potential and most definite market requirements in an internet of things system. Vehicle to everything is usually a communication network that provides vehicle information by using sensors installed on vehicles, vehicle-mounted terminals, or the like, and implements vehicle to vehicle (V2V) communication, vehicle to infrastructure (V2I) communication, vehicle to network (V2N) communication, and vehicle to pedestrian (V2P) communication. Usually, in a V2X scenario, a communication link for direct communication between a terminal and another terminal may be referred to as a sidelink (SL), and an SL interface may be referred to as a PC5 interface.

In new radio (NR) V2X, high-reliability services between terminals impose higher requirements on communication quality. How to ensure correct communication between terminals is a problem that needs to be resolved currently.

SUMMARY

Embodiments of this application provide a communication method and apparatus, to ensure correct communication between terminals.

According to a first aspect, an embodiment of this application provides a communication method, including: A first terminal performs integrity protection verification on a received RRC message; and when the integrity protection verification fails, an RRC layer of the first terminal sends a first indication and an identifier of a second terminal to an application layer of the first terminal, where the first indication and the identifier of the second terminal are used by the application layer to disconnect a unicast connection between the first terminal and the second terminal.

Based on this solution, when the integrity protection verification performed by the first terminal on the received message fails, the RRC layer of the first terminal may report the first indication and the identifier of the second terminal to the application layer, to trigger the application layer to disconnect the unicast connection between the first terminal and the second terminal. Because a processing mechanism for a case in which the integrity protection verification on the received message fails is provided, correct communication between the second terminal and the first terminal can be ensured. In addition, a cause why the integrity protection verification performed on the received message fails is usually that an attacker tampers with some information in the RRC message. Therefore, in the method, communication security can be ensured by disconnecting the unicast connection between the two terminals.

In a possible implementation method, the RRC layer of the first terminal disconnects an RRC connection between the first terminal and the second terminal, where the first indication is an RRC connection disconnection indication, which indicates that the RRC connection between the first terminal and the second terminal is disconnected.

Based on the foregoing solution, the RRC layer of the first terminal first disconnects the RRC connection between the first terminal and the second terminal, and reports a disconnection result to the application layer, to trigger the application layer to disconnect the unicast connection between the first terminal and the second terminal. This helps implement correct communication between the first terminal and the second terminal.

In another possible implementation method, the first indication is an integrity protection verification failure indication, which indicates that the integrity protection verification performed by the first terminal on the RRC message received from the second terminal fails.

Based on the foregoing solution, the first terminal reports the integrity protection verification failure to the application layer, to trigger the application layer to disconnect the unicast connection between the first terminal and the second terminal. This helps implement correct communication between the first terminal and the second terminal.

In a possible implementation method, the application layer of the first terminal updates a layer 2 identifier of the first terminal.

Based on this solution, repeated attacks by an attacker can be prevented because the layer 2 identifier of the first terminal is updated. Therefore, the communication security can be improved.

In a possible implementation method, the first terminal re-establishes the unicast connection to the second terminal by using a new key.

Based on this solution, because the unicast connection is re-established by using the new key, the communication security can be improved.

In a possible implementation method, the first terminal sends sidelink information to a network device, where the sidelink information includes a second indication and the identifier of the second terminal, and the second indication indicates that a radio link failure occurs on the unicast connection between the first terminal and the second terminal and a failure cause is that the integrity protection verification performed on the RRC message received from the second terminal fails.

Based on the foregoing solution, when the integrity protection verification performed by the first terminal on the received RRC message fails, the first terminal may report the second indication and the identifier of the second terminal to the network device. Because the processing mechanism for the case in which the integrity protection verification on the received message fails is provided, the network device may check, based on the reported information, a fault of the unicast connection between the first terminal and the second terminal. Therefore, the correct communication between the second terminal and the first terminal can be ensured.

According to a second aspect, an embodiment of this application provides a communication method, including: A first terminal performs integrity protection verification on a received RRC message; and when the integrity protection verification fails, the first terminal sends sidelink information to a network device, where the sidelink information includes a second indication and an identifier of the second terminal, and the second indication indicates that a radio link failure occurs on a unicast connection between the first terminal and the second terminal and a failure cause is that the integrity protection verification performed on the RRC message received from the second terminal fails.

Based on the foregoing solution, when the integrity protection verification performed by the first terminal on the received RRC message fails, the first terminal may report the second indication and the identifier of the second terminal to the network device. Because a processing mechanism for a case in which the integrity protection verification on the received message fails is provided, the network device may check, based on the reported information, a fault of the unicast connection between the first terminal and the second terminal. Therefore, correct communication between the second terminal and the first terminal can be ensured.

According to a third aspect, an embodiment of this application provides a communication method, including: An application layer of a first terminal sends a first indication to an access stratum of the first terminal after the first terminal determines a new key, where the first indication indicates to re-establish a PDCP entity configured to receive data or indicates that a PDCP layer can use the new key to process received data on a unicast connection, the new key is used for communication on the unicast connection between the first terminal and a second terminal, and the PDCP entity configured to receive data is associated with the unicast connection; and the application layer of the first terminal sends a second indication to the access stratum of the first terminal after the first terminal receives information ciphered by using the new key, where the second indication indicates to re-establish a PDCP entity configured to send data or indicates that the PDCP layer can use the new key to process to-be-sent data on the unicast connection, and the PDCP entity configured to send data is associated with the unicast connection.

"Indicating that a PDCP layer can use the new key to process received data on a unicast connection" may also be understood as "indicating that the PDCP layer has a capability of processing the received data on the unicast connection by using the new key".

"Indicating that the PDCP layer can use the new key to process to-be-sent data on the unicast connection" may also be understood as "indicating that the PDCP layer has a capability of processing the to-be-sent data on the unicast connection by using the new key".

Based on the foregoing solution, the application layer of the terminal may notify, at a corresponding time point, the access stratum that the access stratum can start to use the new key to decrypt the received data, and notify, at a corresponding time point, the access stratum that the access stratum can start to use the new key to cipher the data that needs to be sent, so that correct communication between the first terminal and the second terminal can be ensured.

In a possible implementation method, that an application layer of a first terminal sends a first indication to an access stratum of the first terminal after the first terminal determines a new key includes: After the first terminal determines the new key and sends a security mode command message to the second terminal, the application layer of the first terminal sends the first indication to the access stratum of the first terminal; or after the first terminal determines the new key and determines that the new key can be used to process the received data on the unicast connection, the application layer of the first terminal sends the first indication to the access stratum of the first terminal.

In a possible implementation method, that the application layer of the first terminal sends a second indication to the access stratum of the first terminal after the first terminal receives information ciphered by using the new key includes: After the first terminal receives a security mode complete message ciphered by using the new key, the application layer of the first terminal sends the second indication to the access stratum of the first terminal; or after the first terminal receives the information ciphered by using the new key and determines that the new key can be used to process the to-be-sent data on the unicast connection, the application layer of the first terminal sends the second indication to the access stratum of the first terminal.

In a possible implementation method, the access layer is the PDCP layer; and that an application layer of a first terminal sends a first indication to an access stratum of the first terminal includes: the application layer of the first terminal sends the first indication to the PDCP layer of the first terminal; and that the application layer of the first terminal sends a second indication to the access stratum of the first terminal includes: the application layer of the first terminal sends the second indication to the PDCP layer of the first terminal.

In another possible implementation method, the access stratum is an RRC layer; that an application layer of a first terminal sends a first indication to an access stratum of the first terminal includes: the application layer of the first terminal sends the first indication to the PDCP layer of the first terminal through the RRC layer; and that the application layer of the first terminal sends a second indication to the access stratum of the first terminal includes: the application layer of the first terminal sends the second indication to the PDCP layer of the first terminal through the RRC layer.

According to a fourth aspect, an embodiment of this application provides a communication method, including: A first terminal receives a first data packet from a second terminal, where the first data packet carries a key identifier, and a key corresponding to the key identifier is used for communication on a unicast connection between the first terminal and the second terminal; and the first terminal discards the first data packet if the first terminal does not store a key security context corresponding to the key identifier.

Based on the foregoing solution, after the first terminal receives the first data packet that carries the key identifier, if the first terminal does not store the key security context corresponding to the key identifier, the first terminal discards the first data packet. However, in a conventional technology, a parsing error is found only after the first data packet is parsed and transmitted to an IP layer, and then the first data packet is discarded. It can be learned that in the foregoing solution of this application, the data packet that cannot be parsed can be discarded in advance. Therefore, correct communication between the terminal and another terminal can be ensured, and resource overheads can be further reduced.

According to a fifth aspect, an embodiment of this application provides a communication apparatus. The apparatus may be a first terminal, or may be a chip used in the first terminal. The apparatus has a function of implementing any method in the first aspect to the fourth aspect and the possible implementations of the first aspect to the fourth aspect. The function may be implemented by hardware, or may be implemented by hardware executing corresponding software. The hardware or the software includes one or more modules corresponding to the function.

According to a sixth aspect, an embodiment of this application provides a communication apparatus, including a processor and a memory. The memory is configured to store computer-executable instructions. When the apparatus runs, the processor executes the computer-executable instructions stored in the memory, so that the apparatus performs any method in the first aspect to the fourth aspect and the possible implementation methods of the first aspect to the fourth aspect.

According to a seventh aspect, an embodiment of this application provides a communication apparatus, including units or means (means) configured to perform the steps of any method in the first aspect to the fourth aspect and the possible implementation methods of the first aspect to the fourth aspect.

According to an eighth aspect, an embodiment of this application provides a communication apparatus, including a processor and an interface circuit. The processor is configured to communicate with another apparatus through the interface circuit, and perform any method in the first aspect to the fourth aspect and the possible implementation methods of the first aspect to the fourth aspect. There are one or more processors.

According to a ninth aspect, an embodiment of this application provides a communication apparatus, including a processor. The processor is configured to: be connected to a memory, and invoke a program stored in the memory, to perform any method in the first aspect to the fourth aspect and the possible implementation methods of the first aspect to the fourth aspect. The memory may be located inside or outside the apparatus. In addition, there are one or more processors.

According to a tenth aspect, an embodiment of this application further provides a computer-readable storage medium. The computer-readable storage medium stores instructions. When the instructions are run on a computer, a processor is enabled to perform any method in the first aspect to the fourth aspect and the possible implementation methods of the first aspect to the fourth aspect.

According to an eleventh aspect, an embodiment of this application further provides a computer program product. The computer product includes a computer program. When the computer program runs, any method in the first aspect to the fourth aspect and the possible implementation methods of the first aspect to the fourth aspect is performed.

According to a twelfth aspect, an embodiment of this application further provides a chip system, including a processor. The processor is configured to perform any method in the first aspect to the fourth aspect and the possible implementation methods of the first aspect to the fourth aspect.

DETAILED DESCRIPTION OF ILLUSTRATIVE EMBODIMENTS

Figure 1:
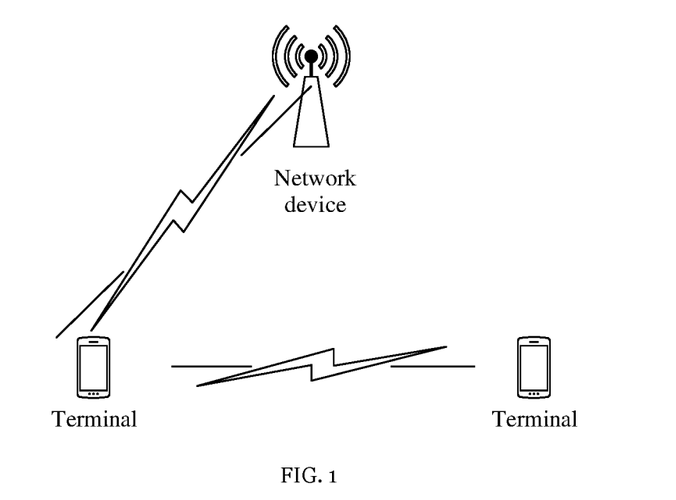
FIG. 1 is a schematic diagram of a network architecture to which an embodiment of this application is applicable.

FIG. 1 is a schematic diagram of a network architecture to which an embodiment of this application is applicable. The network architecture includes at least two terminals and at least one network device. Optionally, the terminal may communicate with the network device through a wireless interface (for example, a Uu interface). The terminals may communicate with each other through the network device; or may directly communicate with each other, for example, communicate with each other through a PC5 interface between the terminals. A link between the terminals may be referred to as a sidelink, a PC5 interface link, or an inter-terminal link.

The terminal is a device having a wireless transceiver function. The terminal may be deployed on land, and includes an indoor device, an outdoor device, a handheld device, or a vehicle-mounted device; or may be deployed on a water surface (for example, on a ship); or may be deployed in the air (for example, on an airplane, a balloon, or a satellite). The terminal may be a mobile phone, a tablet (pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, user equipment (UE), or the like. Direct communication is supported between terminals in embodiments of this application, and the direct communication between the terminals may also be referred to as D2D communication.

The network device is a device that provides a wireless communication function for the terminal. The network device includes but is not limited to a next generation NodeB (gNodeB, gNB) in 5th generation (5G), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission point (transmitting and receiving point, TRP), a transmission point (TP), a mobile switching center, or the like.

When 5G is independently deployed, a logical system of the network device may use a mode in which a central unit (CU) and a distributed unit (DU) are separated. Based on configurations of functions of a protocol stack, a CU-DU logical system may be classified into two types: a CU-DU separation architecture and a CU-DU integrated architecture. For the CU-DU separation architecture, the functions of the protocol stack may be dynamically configured and split. Some functions are implemented in the CU, and remaining functions are implemented in the DU. To meet requirements of different split options, ideal and non-ideal transmission networks need to be supported. An interface between the CU and the DU needs to comply with a 3rd generation partnership project (3GPP) specification requirement. For the CU-DU integrated architecture, logical functions of the CU and the DU are integrated into a same network device, to implement all the functions of the protocol stack.

With development of technologies, D2D communication and cooperative communication between terminals are introduced into a 5G NR technology. An NR V2X standard already supports three types of sidelink communication modes, including broadcast, multicast, and unicast. For an NR V2X unicast connection, in the standard, ciphering and integrity protection are allowed for communication between two terminals in the unicast connection, and updating of a key between the terminals is allowed. Unicast connection key updating is a process in which two terminals on a sidelink update an integrity protection algorithm and a ciphering algorithm for data transmission. The key updating is completed at respective PC5-S layers, and an updated key needs to be used by a packet data convergence protocol (PDCP) entity at an access stratum (AS).

Figure 2:
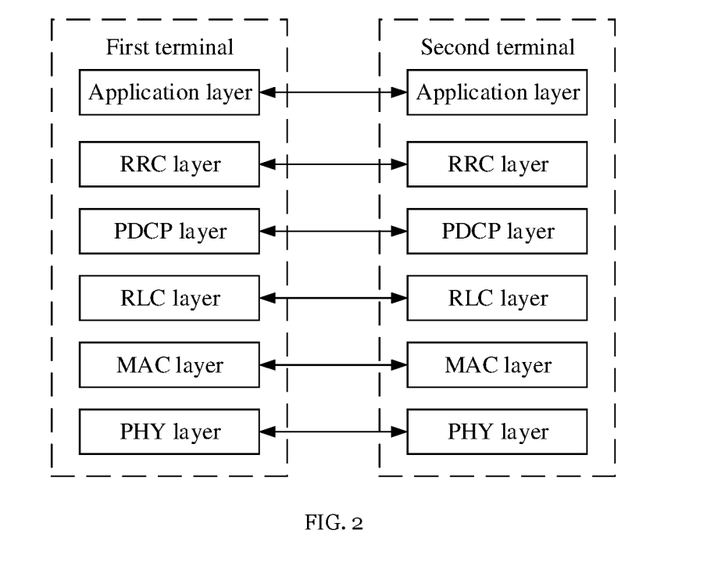
FIG. 2 is a schematic diagram of a protocol stack according to an embodiment of this application.

FIG. 2 is a schematic diagram of a protocol stack according to an embodiment of this application. A protocol stack of a terminal includes at least an application layer, a radio resource control (RRC) layer, a PDCP layer, a radio link control (RLC) layer, a media access control (MAC) layer, and a physical layer (PHY layer). The RRC layer, the PDCP layer, the RLC layer, the MAC layer, and the PHY layer may be collectively referred to as belonging to an access stratum (AS).

The application layer, for example, includes a PC5-S layer or a V2X layer, and is configured to perform control at the application layer.

The RRC layer is configured to support functions such as radio resource management and RRC connection control.

For definitions and functions of other protocol layers such as the PDCP layer and the RLC layer, refer to descriptions in a conventional technology. Details are not described herein.

Figure 3:
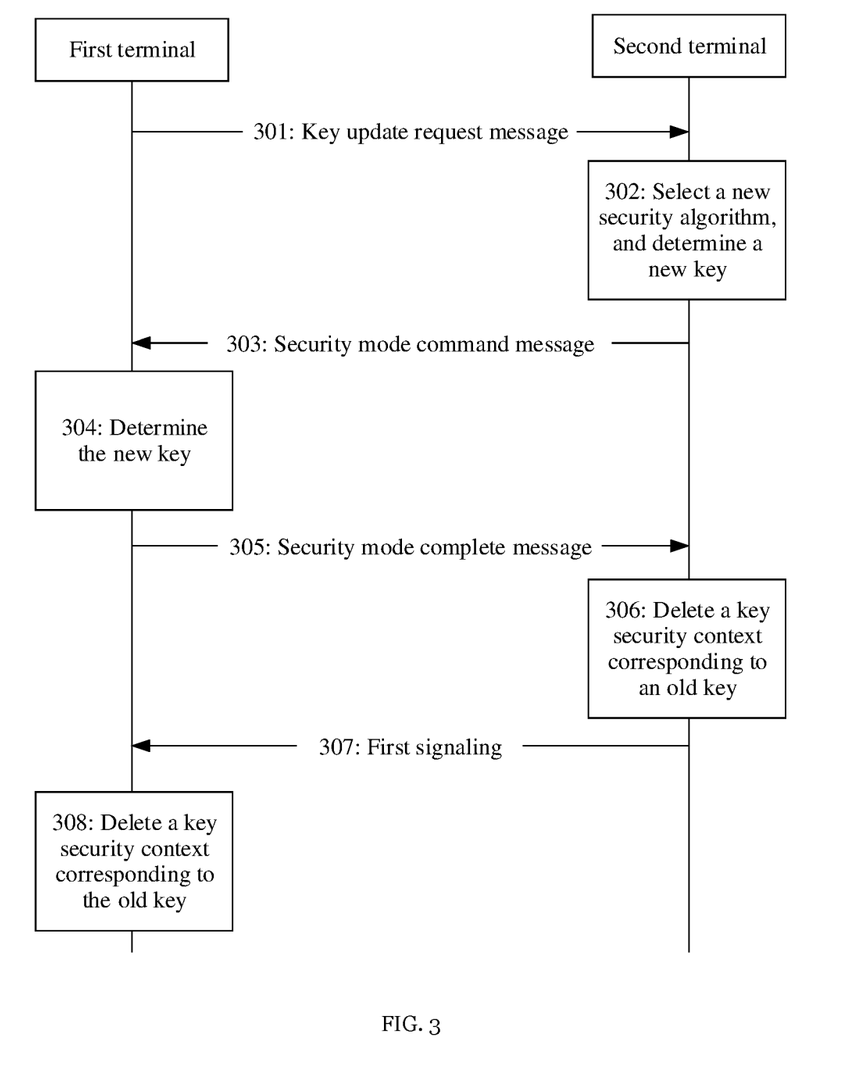
FIG. 3 is a schematic flowchart of updating a key between two terminals in a unicast connection.

FIG. 3 is a schematic flowchart of updating a key between two terminals in a unicast connection. The method includes the following steps.

Step 301: A first terminal sends a key update request message to a second terminal. Correspondingly, the second terminal may receive the key update request message.

The key update request message is used to request to update a key of a unicast connection. The key update request message may be, for example, a DirectRekeyRequest message.

The key update request message carries security capability information of the first terminal, a key update request indication, and eight most significant bits of a new key identifier. The security capability information includes a security algorithm that can be supported by the first terminal in the unicast connection. The security algorithm herein includes an integrity protection algorithm and/or a ciphering algorithm.

It should be noted that, in a key update procedure between the first terminal and the second terminal, the first terminal sends the key update request message to the second terminal to obtain a 256-bit new key, where the new key may be identified by using an identifier of the new key (also referred to as the new key identifier). The new key identifier has 16 bits, where the eight most significant bits are confirmed by the first terminal in advance, and eight least significant bits are confirmed by the second terminal. The first terminal sends the eight most significant bits of the new key identifier to the second terminal, and the second terminal sends the eight least significant bits of the new key identifier to the first terminal, so that both the first terminal and the second terminal can obtain the new key identifier.

Step 302: The second terminal selects a new security algorithm, and determines the new key.

The second terminal selects, based on the security capability information of the first terminal, an integrity protection algorithm from one or more integrity protection algorithms supported by the first terminal, and/or a ciphering algorithm from one or more ciphering algorithms supported by the first terminal. Then, the second terminal determines the new key based on the selected integrity protection algorithm and/or the selected ciphering algorithm.

After determining the new key, the second terminal establishes a security context of the new key. Subsequently, the second terminal may start to receive, from the first terminal, data ciphered by using the new key on the unicast connection. Alternatively, it is understood that the second terminal enables a function of receiving, from the first terminal, data ciphered by using the new key on the unicast connection.

It should be noted that a plurality of unicast connections may be established between the first terminal and the second terminal, and one key is used for each unicast connection. The new key negotiated between the first terminal and the second terminal is for one of the unicast connections.

Step 303: The second terminal sends a security mode command message to the first terminal. Correspondingly, the first terminal may receive the security mode command message.

The security mode command message may be, for example, a DirectSecurityModeCommand message.

The security mode command message carries indications/ an indication of the new integrity protection algorithm and/or the new ciphering algorithm selected by the second terminal, the security capability information of the first terminal, and the eight least significant bits of the new key identifier.

Step 304: The first terminal determines the new key.

The first terminal first performs integrity verification on the received security mode command message, and verifies the carried security capability information of the first terminal. When all verification results are correct, the first terminal obtains the new key based on the new integrity protection algorithm and/or the new ciphering algorithm indicated in the security mode command message and according to a key derivation method that is the same as that used by the second terminal, where the new key is the same as the new key derived by the second terminal.

After determining the new key, the first terminal establishes a security context of the new key, determines that data ciphered by using the new key may be subsequently received from the second terminal on the unicast connection, and may cipher, by using the new key, data that needs to be sent to the second terminal on the unicast connection. Alternatively, it is understood that the second terminal enables a function of receiving, from the first terminal on the unicast connection, data ciphered by using the new key, and enables a function of ciphering, by using the new key, data that needs to be sent to the second terminal on the unicast connection.

Step 305: The first terminal sends a security mode complete message to the second terminal. Correspondingly, the second terminal may receive the security mode complete message.

The security mode complete message may be, for example, a DirectSecurityModeComplete message, used to indicate that the first terminal has completed the key updating.

The second terminal performs integrity verification on the received security mode complete message. When a verification result is correct, the second terminal confirms that the key of the first terminal is correctly updated.

After confirming that the key of the first terminal is correctly updated, the second terminal determines that the new key can be subsequently used to cipher data that needs to be sent to the first terminal on the unicast connection. Alternatively, it is understood that the second terminal enables a function of ciphering, by using the new key, data that needs to be sent to the first terminal on the unicast connection.

Step 306: The second terminal deletes a key security context corresponding to an old key.

After confirming that the key of the first terminal is correctly updated, the second terminal subsequently sends data to the first terminal by using the new key, and therefore deletes the key security context corresponding to the old key.

Step 307: The second terminal sends first signaling to the first terminal. Correspondingly, the first terminal may receive the first signaling.

The first signaling is ciphered by using the new key.

Step 308: The first terminal deletes a key security context corresponding to the old key.

The first terminal parses the first signaling. If the first signaling can be correctly parsed, it indicates that the first terminal can correctly receive data ciphered by using the new key. Therefore, the key security context corresponding to the old key can be deleted.

It should be noted that step 306 may alternatively be performed after step 307.

In the foregoing process, the key updating between the first terminal and the second terminal is implemented, and communication security can be improved.

For the foregoing key update procedure between the first terminal and the second terminal, at least the following two problems exist:

Problem (1): During data reception and data sending, occasions on which the second terminal starts to use the new key are different. Specifically, after determining the new key, the second terminal may start to receive, from the first terminal, data ciphered by using the new key. However, after confirming that the key of the first terminal is correctly updated, the second terminal determines that the new key can be used to cipher data that needs to be sent to the first terminal. Occasions on which the second terminal starts to use the new key are different during data reception and data sending. Therefore, how an AS of the second terminal learns of when the new key can be used to cipher data that needs to be sent to the first terminal, and how the AS of the second terminal learns of when data ciphered by using the new key can be received from the first terminal, to ensure correct communication between the second terminal and the first terminal is a problem to be resolved.

Problem (2): Occasions on which the first terminal and the second terminal delete the key security contexts corresponding to the old key are different. Refer to FIG. 3. The first terminal deletes the key security context corresponding to the old key after step 307, and the second terminal deletes the key security context corresponding to the old key after step 305. After deleting the key security context corresponding to the old key, the second terminal may continue to receive data that is ciphered by using the old key and that is sent by the first terminal. Because procedures such as RLC entity re-establishment and MAC entity reset are not introduced in a sidelink key update procedure, data that is ciphered by using the old key and that is received from the first terminal may include one or more of data that is not completely transmitted in an RLC buffer, data that is not completely transmitted in a MAC layer buffer, and data that is retransmitted due to a transmission failure. In this case, how the second terminal identifies and processes the data ciphered by using the old key, to ensure correct communication between the second terminal and the first terminal is also a problem to be resolved.

In addition, in a normal communication process after the first terminal and the second terminal complete the key update procedure, the following problem may further occur:

Problem (3): The first terminal or the second terminal fails to perform integrity protection verification on a received message. In this case, how the first terminal or the second terminal performs processing to ensure correct communication between the second terminal and the first terminal is also a problem to be resolved.

To resolve the foregoing problems (1) to (3), embodiments of this application provide different communication methods. It should be noted that a key (for example, an old key or a new key) mentioned in the communication methods is for a specific unicast connection established between the first terminal and the second terminal. Alternatively, it is understood that a plurality of unicast connections may be established between the first terminal and the second terminal, and one key is used for each unicast connection.

Figure 4:
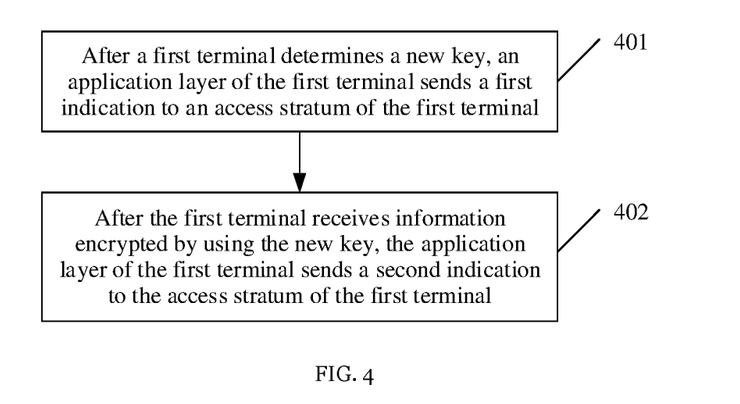
FIG. 4 is a schematic diagram of a communication method according to an embodiment of this application.

To resolve the foregoing problem (1), an embodiment of this application provides a communication method. The method is applicable to the first terminal and the second terminal, where the first terminal communicates with the second terminal on a unicast connection.

As shown in FIG. 4, the method includes the following steps.

Step 401: After the first terminal determines a new key, an application layer of the first terminal sends a first indication to an access stratum of the first terminal, where the first indication indicates to re-establish a PDCP entity configured to receive data or indicates that a PDCP layer can process received data on the unicast connection by using the new key. The new key is used for communication on the unicast connection between the first terminal and the second terminal.

The first indication indicates that the PDCP layer can process the received data on the unicast connection by using the new key, or may be understood as indicating that the PDCP layer can receive data ciphered by using the new key, or may be understood as indicating that the PDCP layer has a capability of processing the received data on the unicast connection by using the new key.

The first indication may be a capability indication that is of processing the received data by using the new key and that is sent by the application layer of the first terminal to the access stratum of the first terminal, to trigger the application layer of the first terminal to use the new key and new integrity protection and ciphering algorithms, so that the first terminal has a capability of processing the received data on the unicast connection by using the new key. Alternatively, the first indication may be a re-establishment indication, sent by the application layer of the first terminal to the access stratum of the first terminal, of the PDCP entity that is related to the unicast connection and that receives data. The new key and the new integrity protection and ciphering algorithms are applied in a process of re-establishing the PDCP entity that receives data, so that the first terminal has a capability of processing the received data on the unicast connection by using the new key.

The PDCP entity configured to receive data is associated with the unicast connection between the first terminal and the second terminal. Alternatively, it is understood that there may be a plurality of unicast connections between the first terminal and the second terminal, and the PDCP entity configured to receive data is associated with one of the unicast connections. When there are a plurality of unicast connections, different PDCP entities need to be associated with different unicast connections.

The application layer of the first terminal may be a PC5-S layer or a V2X layer.

That an application layer of the first terminal sends a first indication to an access stratum may be, for example, that the application layer sends the first indication to the PDCP layer. For another example, the application layer may alternatively send the first indication to an RRC layer. After receiving the first indication, the RRC layer may indicate the PDCP layer to re-establish the PDCP entity configured to receive data on the unicast connection. Specifically, the PDCP entity that is configured to process the received data on the unicast connection by using the new key is re-established, to be specific, the newly established PDCP entity decrypts the received data on the unicast connection by using the new key.

In an implementation method, that after the first terminal determines the new key may be, for example, that after the first terminal sends a security mode command message (for example, the message in step 303 in the embodiment in FIG. 3) to the second terminal.

In another implementation method, that after the first terminal determines the new key may be, for example, that after the first terminal receives a key update request message (for example, the message in step 301 in the embodiment in FIG. 3) and determines, based on this, that the new key can be used to process the received data on the unicast connection. That the first terminal determines that the new key can be used to process the received data on the unicast connection may also be understood as that the first terminal can use an old key to process to-be-sent data on the unicast connection and can use the new key to process the received data on the unicast connection.

Step 402: After the first terminal receives information (such as signaling (signaling), a message, or data) ciphered by using the new key, the application layer of the first terminal sends a second indication to the access stratum of the first terminal, where the second indication indicates to re-establish a PDCP entity configured to send data or indicates that the PDCP layer can use the new key to process to-be-sent data on the unicast connection.

The second indication indicates that the PDCP layer can use the new key to process the to-be-sent data on the unicast connection, or may be understood as indicating that the PDCP layer can send data, on the unicast connection, ciphered by using the new key, or may be understood as indicating that the PDCP layer can use the new key to cipher and send data that needs to be sent on the unicast connection, or may be understood as indicating that the PDCP layer has a capability of processing the to-be-sent data on the unicast connection by using the new key.

Specifically, the second indication may be a capability indication that is of processing the to-be-sent data by using the new key and that is sent by the application layer of the first terminal to the access stratum of the first terminal, to trigger the application layer of the first terminal to apply the new key and the new integrity protection and ciphering algorithms, so that the first terminal has a capability of processing the to-be-sent data on the unicast connection by using the new key. Alternatively, the application layer of the first terminal may send, to the access stratum of the first terminal, a re-establishment indication of the PDCP entity that is related to the unicast connection and that sends data. In a process of re-establishing the PDCP entity that receives data, the new key and the new integrity protection and ciphering algorithms are applied, so that the first terminal has a capability of processing the to-be-sent data on the unicast connection by using the new key.

The PDCP entity configured to send data is associated with the unicast connection between the first terminal and the second terminal. Alternatively, it is understood that there may be a plurality of unicast connections between the first terminal and the second terminal, and the PDCP entity configured to send data is associated with one of the unicast connections. When there are a plurality of unicast connections, different PDCP entities need to be associated with different unicast connections.

It should be noted that the PDCP entity configured to send data and the PDCP entity configured to receive data in this embodiment are associated with a same unicast connection.

That the application layer of the first terminal sends a second indication to the access stratum may be, for example, that the application layer sends the second indication to the PDCP layer. Alternatively, the application layer may send the second indication to the RRC layer. After receiving the second indication, the RRC layer may indicate the PDCP layer to re-establish the PDCP entity configured to send data. Specifically, the PDCP entity that is used to cipher and send, by using the new key, data that needs to be sent on the unicast connection is re-established.

In an implementation method, that after the first terminal receives the data ciphered by using the new key may be, for example, that after the first terminal receives a security mode complete message (for example, the message in step 305 in the embodiment in FIG. 3) from the second terminal.

In another implementation method, that after the first terminal determines the new key, or that after the first terminal determines that the new key can be used to process the to-be-sent data on the unicast connection may be, for example, that after it is verified that the data ciphered by using the new key received from the first terminal is correct and based on this, it is considered that the first terminal has confirmed the new key and established a security context related to the new key. That the first terminal determines that the new key can be used to process the to-be-sent data on the unicast connection may also be understood as that the first terminal can use the new key to process the received data on the unicast connection and can use the new key to process the to-be-sent data on the unicast connection.

It should be noted that the first terminal in the embodiment in FIG. 4 may be the second terminal in the embodiment in FIG. 3, and the second terminal in the embodiment in FIG. 4 may be the first terminal in the embodiment in FIG. 3.

In an implementation method, the first indication may also be referred to as a PDCP entity re-establishment indication. When receiving the first indication, the PDCP layer re-establishes the PDCP entity. The second indication may also be referred to as a PDCP entity re-establishment indication. When receiving the second indication, the PDCP layer re-establishes the PDCP entity.

Based on the foregoing solution, the application layer of the terminal may notify, at a corresponding time point, the access stratum that the access stratum can start to use the new key to decrypt the received data, and notify, at a corresponding time point, the access stratum that the access stratum can start to use the new key to cipher the data that needs to be sent, so that correct communication between the first terminal and the second terminal can be ensured.

In an implementation method, for the first terminal in the embodiment in FIG. 3 or the second terminal in the embodiment in FIG. 4, after the terminal determines a new key, an application layer of the terminal sends a third indication to an access stratum of the terminal, where the third indication indicates to re-establish a PDCP entity configured to send data and re-establish a PDCP entity configured to receive data, or indicates that a PDCP layer can use the new key to process to-be-sent data and received data on a unicast connection.

It should be noted that the PDCP entity configured to send data on the unicast connection and the PDCP entity configured to receive data on the unicast connection are different PDCP entities.

The third indication indicates that the PDCP layer can use the new key to process the to-be-sent data and the received data on the unicast connection, or may be understood as indicating that the PDCP layer can use the new key to cipher and send data that needs to be sent on the unicast connection, and can decrypt the received data on the unicast connection by using the new key. In an implementation method, the third indication may also be referred to as a PDCP entity re-establishment indication. When receiving the third indication, the PDCP layer re-establishes the PDCP entities.

The application layer of the terminal may be a PC5-S layer or a V2X layer.

That an application layer of the terminal sends a third indication to an access stratum may be, for example, that the application layer sends a first indication to the PDCP layer. For another example, the application layer may send the third indication to an RRC layer. After receiving the third indication, the RRC layer may indicate the PDCP layer to re-establish the PDCP entity configured to send data on the unicast connection and the PDCP entity configured to receive data on the unicast connection.

In an implementation method, that after the terminal determines the new key may be, for example, that after the new key is determined and before a security mode complete message (for example, the message in step 305 in the embodiment in FIG. 3) is sent.

In another implementation method, that after the terminal determines the new key may alternatively be that after the terminal determines that the new key can be used to process the to-be-sent data and the received data on the unicast connection, for example, may be that after a security mode command message (for example, the message in step 303 in the embodiment of FIG. 3) sent by the second terminal is received and verified to be correct, and based on this, it is considered that the second terminal has confirmed the new key and established a security context related to the new key.

Figure 5:
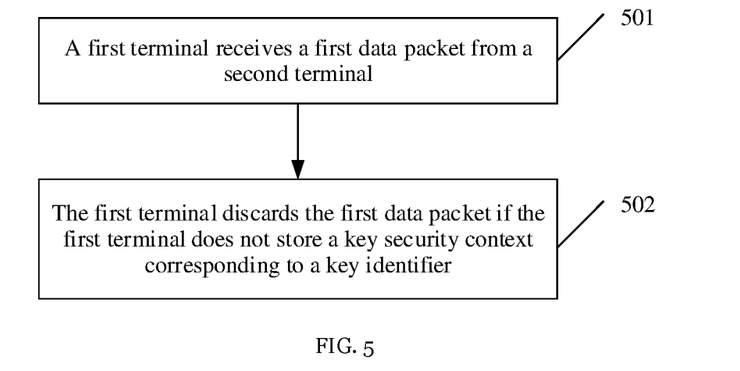
FIG. 5 is a schematic diagram of another communication method according to an embodiment of this application.

To resolve the foregoing problem (2), an embodiment of this application provides a communication method. The method is applicable to the first terminal and the second terminal, where the first terminal communicates with the second terminal on a unicast connection.

As shown in FIG. 5, the method includes the following steps.

Step 501: The first terminal receives a first data packet from the second terminal, where the first data packet carries a key identifier, and a key corresponding to the key identifier is used for communication on the unicast connection between the first terminal and the second terminal.

The first data packet is ciphered by using the key corresponding to the key identifier. For example, the first data packet may be a PDCP data protocol data unit (PDU) received from a lower layer by a PDCP entity that receives data, where the first data packet includes a control plane data packet and/or a user plane data packet.

Normally, the first terminal stores a key security context corresponding to the key identifier. In some cases, for example, in the key update procedure in the embodiment in FIG. 3, the first terminal also deletes the key security context corresponding to the old key, and establishes the key security context corresponding to the new key.

After the key security context corresponding to the old key is deleted, the first terminal may continue to receive data ciphered by using the old key. For example, after deleting the key security context corresponding to the old key, the second terminal in the embodiment in FIG. 3 may continue to receive data ciphered by using the old key.

Step 502: The first terminal discards the first data packet if the first terminal does not store the key security context corresponding to the key identifier.

If the first terminal stores the key security context corresponding to the key identifier, the first terminal receives and processes the first data packet. For example, the first terminal decrypts the first data packet by using the key corresponding to the key identifier.

If the first terminal does not store the key security context corresponding to the key identifier, it indicates that the first terminal and the second terminal once used the key corresponding to the key identifier. However, due to some causes, for example, key updating, the first terminal deletes the key security context corresponding to the key. Therefore, if the first terminal continues to receive the key security context corresponding to the key, the first terminal cannot decrypt the first data. Therefore, the first terminal may discard the first data packet.

For example, the first terminal in this embodiment may be the second terminal in the embodiment corresponding to FIG. 3.

Based on the foregoing solution, after the first terminal receives the first data packet that carries the key identifier, if the first terminal does not store the key security context corresponding to the key identifier, the first terminal discards the first data packet. However, in a conventional technology, a parsing error is found only after the first data packet is parsed and transmitted to an internet protocol (IP) layer, and then the first data packet is discarded. It can be learned that in the foregoing solution of this application, the data packet that cannot be parsed can be discarded in advance. Therefore, correct communication between the terminal and another terminal can be ensured, and resource overheads can be further reduced.

Figure 6:
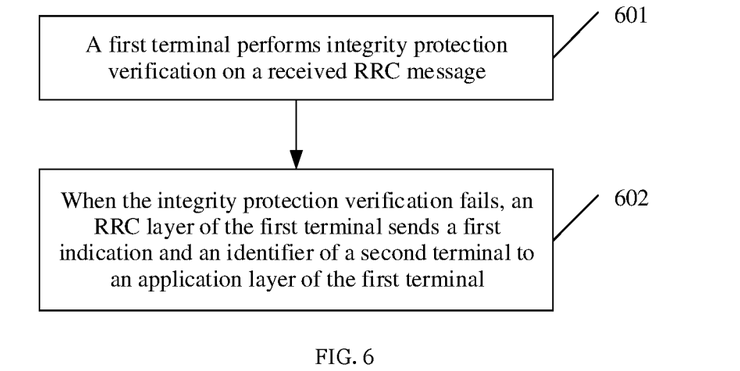
FIG. 6 is a schematic diagram of another communication method according to an embodiment of this application.

To resolve the foregoing problem (3), an embodiment of this application provides a communication method. The method is applicable to the first terminal and the second terminal, where the first terminal communicates with the second terminal on a unicast connection.

A process of establishing the unicast connection between the first terminal and the second terminal is as follows: The first terminal first establishes the unicast connection with the second terminal, and automatically establishes an RRC connection between the first terminal and the second terminal after the unicast connection is successfully established.

A process of disconnecting the unicast connection between the first terminal and the second terminal is as follows: The first terminal first disconnects the unicast connection between the first terminal and the second terminal, and automatically disconnects the RRC connection between the first terminal and the second terminal after the unicast connection is disconnected successfully.

As shown in FIG. 6, the method includes the following steps.

Step 601: The first terminal performs integrity protection verification on a received RRC message.

The RRC message in this step may also be referred to as a PC5-RRC message. The first terminal receives the RRC message from the second terminal that establishes the unicast connection to the first terminal, and performs integrity protection verification on the RRC message.

Step 602: When the integrity protection verification fails, an RRC layer of the first terminal sends a first indication and an identifier of the second terminal to an application layer of the first terminal, where the first indication and the identifier of the second terminal are used by the application layer to disconnect the unicast connection between the first terminal and the second terminal.

The application layer herein may be a PC5-S layer or a V2X layer.

After receiving the first indication and the identifier of the second terminal from the RRC layer, the application layer of the first terminal disconnects the unicast connection between the first terminal and the second terminal based on the first indication and the identifier of the second terminal. A cause why the integrity protection verification performed on the received message fails may be that an attacker tampers with some information in the received RRC message. Therefore, in the method, communication security can be ensured by disconnecting the unicast connection between the two terminals.

Optionally, the application layer of the first terminal may alternatively update a layer 2 identifier (Layer 2 ID), namely, a MAC layer identity of the first terminal, to improve the communication security.

Optionally, the first terminal may alternatively re-establish the unicast connection to the second terminal by using the new key, so that the communication security is improved.

Based on this solution, when the integrity protection verification performed by the first terminal on the received message fails, the RRC layer of the first terminal may report the first indication and the identifier of the second terminal to the application layer, to trigger the application layer to disconnect the unicast connection between the first terminal and the second terminal. Because a processing mechanism for a case in which the integrity protection verification on the received message fails is provided, correct communication between the second terminal and the first terminal can be ensured. In addition, a cause why the integrity protection verification performed on the received message fails is usually that an attacker tampers with some information in the RRC message. Therefore, in the method, the communication security can be ensured by disconnecting the unicast connection between the two terminals.

For example, the following provides two different implementation methods of the first indication in step 602.

Method 1: The First Indication is an RRC Connection Disconnection Indication.

The RRC connection disconnection indication indicates that the RRC connection between the first terminal and the second terminal is disconnected.

To be specific, according to the method 1, after step 601, the first terminal first disconnects the RRC connection between the first terminal and the second terminal, and then the RRC layer of the first terminal sends the RRC connection disconnection indication and the identifier of the second terminal to the application layer in step 602. If the application layer of the first terminal determines, based on the RRC connection disconnection indication, that the RRC connection between the first terminal and the second terminal is disconnected, the application layer of the first terminal is triggered to disconnect the unicast connection between the first terminal and the second terminal.

Method 2: The First Indication is an Integrity Protection Verification Failure Indication.

The integrity protection verification failure indication indicates that the integrity protection verification performed by the first terminal on the received RRC message fails.

To be specific, according to the method 2, after failing to perform integrity protection verification on the received RRC message in step 601, the RRC layer of the first terminal sends the integrity protection verification failure indication and the identifier of the second terminal to the application layer of the first terminal in step 602. The application layer of the first terminal disconnects the unicast connection between the first terminal and the second terminal based on the integrity protection verification failure indication and the identifier of the second terminal. After the unicast connection between the first terminal and the second terminal is disconnected, the RRC connection between the first terminal and the second terminal is also automatically disconnected.

Figure 7:
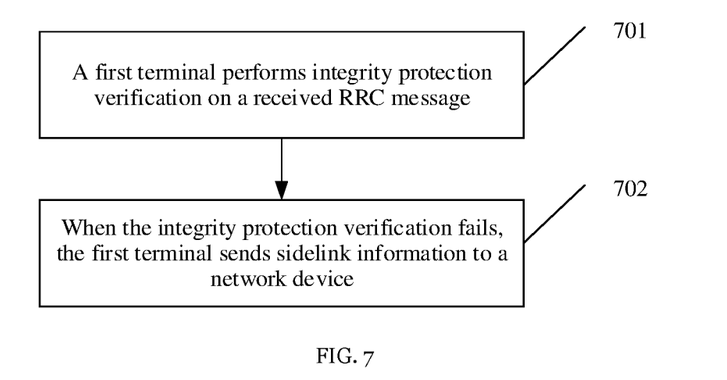
FIG. 7 is a schematic diagram of another communication method according to an embodiment of this application.

To resolve the foregoing problem (3), an embodiment of this application provides another communication method. As shown in FIG. 7, the method includes the following steps.

Step 701: The first terminal performs integrity protection verification on a received RRC message.

The RRC message in this step may also be a PC5-RRC message. The first terminal receives the RRC message from the second terminal that establishes a unicast connection to the first terminal, and performs integrity protection verification on the RRC message.

Step 702: The first terminal sends sidelink information to a network device when the integrity protection verification fails, where the sidelink information includes a second indication and an identifier of the second terminal.

In an implementation method, the second indication is an integrity protection verification failure indication, which indicates that the integrity protection verification performed by the first terminal on the RRC message received from the second terminal fails. Therefore, the network device learns that the integrity protection verification performed by the first terminal on the RRC message received from the second terminal fails.

In another implementation method, the second indication may alternatively indicate that a radio link failure (RLF) occurs on the unicast connection between the first terminal and the second terminal and a failure cause is that the integrity protection verification performed on the RRC message received from the second terminal fails. Therefore, the network device learns that the integrity protection verification performed by the first terminal on the RRC message received from the second terminal fails.

Optionally, after learning that the integrity protection verification performed by the first terminal on the RRC message received from the second terminal fails, the network device may attempt to find an attacker, trigger an alarm, or the like.

Based on the foregoing solution, when the integrity protection verification performed by the first terminal on the received RRC message fails, the first terminal may report the second indication and the identifier of the second terminal to the network device. Because a processing mechanism for a case in which the integrity protection verification on the received message fails is provided, the network device may check, based on the reported information, a fault of the unicast connection between the first terminal and the second terminal. Therefore, correct communication between the second terminal and the first terminal can be ensured.

In the foregoing embodiment in FIG. 6 or the embodiment in FIG. 7, when the integrity protection verification performed by the first terminal on the received RRC message on a control plane fails, a corresponding processing method is provided. In another scenario, if the integrity protection verification performed by the first terminal on a received user plane message fails, the first terminal may send sidelink information to the network device. The sidelink information includes an integrity protection verification failure indication and the identifier of the second terminal. In other words, after the first terminal fails to perform integrity protection verification on the received user plane message, the first terminal is triggered to report, to the network device, the sidelink information that carries the integrity protection verification failure indication and the identifier of the second terminal, so that the network device learns that the integrity protection verification performed by the first terminal on the RRC message received from the second terminal fails.

Optionally, after learning that the integrity protection verification performed by the first terminal on the user plane message received from the second terminal fails, the network device may attempt to find an attacker, trigger an alarm, or the like.

Optionally, only when determining that a quantity of data packets discarded due to the integrity protection verification failure on the user plane message reaches a preset threshold, the first terminal is triggered to report, to the network device, the sidelink information that carries the integrity protection verification failure indication and the identifier of the second terminal.

Based on the foregoing solution, when the integrity protection verification performed by the first terminal on the received user plane message fails, the first terminal may report the integrity protection verification failure indication and the identifier of the second terminal to the network device. Because a processing mechanism for a case in which the integrity protection verification on the received user plane message fails is provided, the network device may check, based on the reported information, a fault of the unicast connection between the first terminal and the second terminal. Therefore, correct communication between the second terminal and the first terminal can be ensured.

It should be noted that the foregoing embodiments in this application may be separately implemented, or may be implemented in combination with each other. Specifically, any two or more embodiments in the embodiments respectively corresponding to FIG. 4 to FIG. 7 may be mutually combined for implementation.

It should be noted that, during specific implementation, the identifier of the second terminal in any one of the foregoing embodiments of this application may be, for example, a layer 2 identifier, an IP address, or a subscriber identity module (SIM) of the second terminal.

Figure 8:
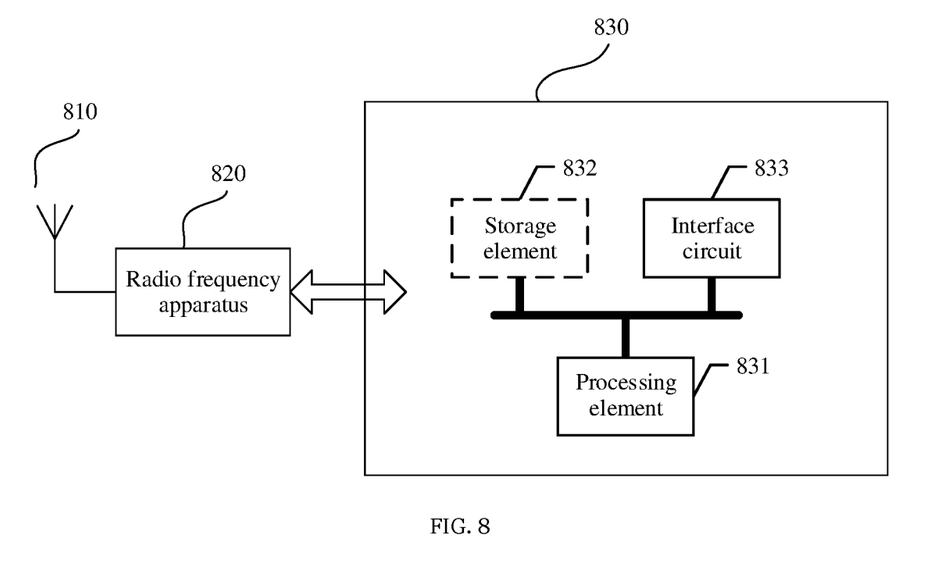
FIG. 8 is a schematic diagram of a terminal according to an embodiment of this application.

FIG. 8 is a schematic diagram of a structure of a terminal according to an embodiment of this application. The terminal is configured to implement the operations of the terminal (for example, the first terminal or the second terminal) in the foregoing embodiments. As shown in FIG. 8, the terminal includes an antenna 810, a radio frequency apparatus 820, and a signal processing part 830. The antenna 810 is connected to the radio frequency apparatus 820. In a downlink direction, the radio frequency apparatus 820 receives, through the antenna 810, information sent by a network device or another terminal, and sends the information sent by the network device or the another terminal, to the signal processing part 830 for processing. In an uplink direction, the signal processing part 830 processes information about the terminal, and sends the information to the radio frequency apparatus 820. After processing the information about the terminal device, the radio frequency apparatus 820 sends processed information to the network device or the another terminal through the antenna 810.

The signal processing part 830 is configured to process data at each communication protocol layer. The signal processing part 830 may be a subsystem of the terminal. The terminal may further include another subsystem, for example, a central processing subsystem, configured to implement processing on an operating system and an application layer of the terminal. For another example, a peripheral subsystem is configured to implement a connection to another device. The signal processing part 830 may be a separately disposed chip. Optionally, the foregoing apparatus may be located in the signal processing part 830.

The signal processing part 830 may include one or more processing elements 831, for example, include a main control CPU and another integrated circuit, and further include an interface circuit 833. In addition, the signal processing part 830 may further include a storage element 832. The storage element 832 is configured to store data and a program. The program used to perform the method performed by the terminal device in the foregoing methods may be stored or may not be stored in the storage element 832. For example, the program is stored in a memory outside the signal processing part 830. When the program is used, the signal processing part 830 loads the program into a cache for use. The interface circuit 833 is configured to communicate with an apparatus. The foregoing apparatus may be located in the signal processing part 830. The signal processing part 830 may be implemented by a chip. The chip includes at least one processing element and an interface circuit. The processing element is configured to perform steps in any method performed by the foregoing terminal. The interface circuit is configured to communicate with another apparatus. In an implementation, units for implementing the steps in the foregoing methods may be implemented by scheduling a program by the processing element. For example, the apparatus includes a processing element and a storage element. The processing element invokes a program stored in the storage element, to perform the methods performed by the terminal in the foregoing method embodiments. The storage element may be a storage element located on a same chip as the processing element, namely, an on-chip storage element.

In another implementation, a program used to perform the method performed by the terminal in the foregoing method may be in a storage element located on a different chip from the processing element, namely, an off-chip storage element. In this case, the processing element invokes or loads the program from the off-chip storage element to the on-chip storage element, to invoke and perform the methods performed by the terminal in the foregoing method embodiment.

In still another implementation, units in the terminal for implementing the steps in the foregoing methods may be configured as one or more processing elements. These processing elements are disposed in the signal processing part 830. The processing elements herein may be an integrated circuit, for example, one or more ASICs, one or more DSPs, one or more FPGAs, or a combination of these types of integrated circuits. The integrated circuits may be integrated together to form a chip.

The units for implementing the steps in the foregoing methods may be integrated together and implemented in a form of a system-on-a-chip (SOC). The SOC chip is configured to implement the foregoing methods. At least one processing element and a storage element may be integrated into the chip, and the processing element invokes a program stored in the storage element to implement the foregoing method performed by the terminal. Alternatively, at least one integrated circuit may be integrated into the chip, to implement the foregoing method performed by the terminal. Alternatively, with reference to the foregoing implementations, functions of some units may be implemented by invoking a program by the processing element, and functions of some units may be implemented by the integrated circuit.

It can be learned that the foregoing apparatus may include at least one processing element and an interface circuit. The at least one processing element is configured to perform any method that is provided in the foregoing method embodiments and performed by the terminal. The processing element may perform some or all steps performed by the terminal in a first manner, that is, by invoking a program stored in the storage element; or may perform some or all steps performed by the terminal in a second manner, that is, by combining instructions and an integrated logic circuit of hardware in the processing element. Certainly, some or all steps performed by the terminal may be alternatively performed by combining the first manner and the second manner.

As described above, the processing element herein may be a general-purpose processor, for example, a CPU, or may be one or more integrated circuits, for example, one or more ASICs, one or more microprocessors DSPs, one or more FPGAs, or a combination of at least two of these types of integrated circuits, configured to implement the foregoing method. The storage element may be one memory, or may be a general term of a plurality of storage elements.

A person of ordinary skill in the art may understand that "first", "second", "third", and various numbers in this application are merely used for differentiation for ease of description, and are not for limiting the scope of embodiments of this application or representing a sequence. The term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. "At least one" means one or more. At least two means two or more. "At least one", "any one", or a similar expression thereof means any combination of these items, including any combination of a single item (piece) or a plurality of items (pieces). For example, at least one (piece or type) of a, b, or c may indicate: a, b, c, a and b, a and c, b and c, or a, b, and c, where a, b, and c may be singular or plural. The term "a plurality of" means two or more, and another quantifier is similar to this.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present invention.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one place, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits in embodiments of this application may implement or operate the functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Optionally, the storage medium may alternatively be integrated into a processor. The processor and the storage medium may be disposed in the ASIC.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or special-purpose computer.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, comprising:
receiving, by a first terminal, a first data packet from a second terminal, wherein the first data packet carries a key identifier, the key identifier corresponding to a key used for communication on a unicast connection between the first terminal and the second terminal;
discarding, by the first terminal, the first data packet when the first terminal does not store a key security context corresponding to the key identifier;
performing, by the first terminal, integrity protection verification on a radio resource control (RRC) message received from the second terminal; and
when the integrity protection verification fails, sending, by a radio resource control (RRC) layer of the first terminal, a first indication and an identifier of the second terminal to an application layer of the first terminal, wherein the first indication and the identifier of the second terminal are used by the application layer of the first terminal to disconnect the unicast connection between the first terminal and the second terminal, and the application layer of the first terminal is a higher layer in a protocol stack of the first terminal than the RRC layer of the first terminal.

2. The method according to claim 1, wherein the method further comprises:
disconnecting, by the RRC layer of the first terminal, an RRC connection between the first terminal and the second terminal, wherein
the first indication is an RRC connection disconnection indication, which indicates that the RRC connection between the first terminal and the second terminal is disconnected.

3. The method according to claim 1, wherein the first indication is an integrity protection verification failure indication, which indicates that the integrity protection verification performed by the first terminal on the RRC message received from the second terminal fails.

4. The method according to claim 1, wherein the method further comprises:
updating, by the application layer of the first terminal, a layer 2 identifier of the first terminal.

5. The method according to claim 1, wherein the method further comprises:
re-establishing, by the first terminal, the unicast connection to the second terminal using a new key.

6. The method according to claim 1, wherein the method further comprises:
sending, by the first terminal, sidelink information to a network device, wherein the sidelink information comprises a second indication and the identifier of the second terminal, and the second indication indicates that a radio link failure occurs on the unicast connection between the first terminal and the second terminal and a failure cause is that the integrity protection verification performed on the RRC message received from the second terminal fails.

7. The method according to claim 1, wherein the application layer comprises a PC5-S layer or a V2X layer.

8. The method according to claim 1, further comprising:
in response to the application layer of the first terminal receiving the first indication and the identifier of the second terminal, disconnecting, by the application layer of the first terminal, the unicast connection between the first terminal and the second terminal based on the first indication and the identifier of the second terminal.

9. The method according to claim 8, further comprising:
in response to disconnecting, by the application layer of the first terminal, the unicast connection between the first terminal and the second terminal based on the first indication and the identifier of the second terminal, updating, by the application layer of the first terminal, a layer 2 identifier of the first terminal.

10. A communication apparatus, comprising at least one processor and a non-transitory memory, wherein the at least one processor is coupled to the memory, and the at least one processor is configured to:
receive a first data packet from a second terminal, wherein the first data packet carries a key identifier, the key identifier corresponding to a key used for communication on a unicast connection between the communication apparatus and the second terminal;
discard the first data packet when the communication apparatus does not store a key security context corresponding to the key identifier;
perform integrity protection verification on a radio resource control (RRC) message received from the second terminal; and
when the integrity protection verification fails, send, from a radio resource control (RRC) layer of the communication apparatus, a first indication and an identifier of the second terminal to an application layer of the communication apparatus, wherein the first indication and the identifier of the second terminal are used by the application layer to disconnect the unicast connection between the communication apparatus and the second terminal, and the application layer of the communication apparatus is a higher layer in a protocol stack of the communication apparatus than the RRC layer of the communication apparatus.

11. The communication apparatus according to claim 10, wherein the processor is further configured to:
disconnect, on the RRC layer of the communication apparatus, an RRC connection between the communication apparatus and the second terminal, wherein
the first indication is an RRC connection disconnection indication, which indicates that the RRC connection between the communication apparatus and the second terminal is disconnected.

12. The communication apparatus according to claim 10, wherein the first indication is an integrity protection verification failure indication, which indicates that the integrity protection verification performed by the communication apparatus on the RRC message received from the second terminal fails.

13. The communication apparatus according to claim 10, wherein the processor is further configured to:
update, on the application layer of the communication apparatus, a layer 2 identifier of the communication apparatus.

14. The communication apparatus according to claim 10, wherein the processor is further configured to:
re-establish the unicast connection to the second terminal using a new key.

15. The communication apparatus according to claim 10, wherein the processor is further configured to:
send sidelink information to a network device, wherein the sidelink information comprises a second indication and the identifier of the second terminal, and the second indication indicates that a radio link failure occurs on the unicast connection between the communication apparatus and the second terminal and a failure cause is that the integrity protection verification performed on the RRC message received from the second terminal fails.

16. The communication apparatus according to claim 10, wherein the application layer comprises a PC5-S layer or a V2X layer.

17. A non-transitory computer-readable storage medium, wherein the storage medium stores a computer program or instructions, and when the computer program or the instructions are executed by a communication apparatus, the communication apparatus is caused to perform:
receiving a first data packet from a second terminal, wherein the first data packet carries a key identifier, the key identifier corresponding to a key used for communication on a unicast connection between the communication apparatus and the second terminal;
discarding the first data packet when the communication apparatus does not store a key security context corresponding to the key identifier;
performing integrity protection verification on a radio resource control (RRC) message received from the second terminal; and
when the integrity protection verification fails, sending, from a radio resource control (RRC) layer of the communication apparatus, a first indication and an identifier of the second terminal to an application layer of the communication apparatus, wherein the first indication and the identifier of the second terminal are used by the application layer to disconnect the unicast connection between the communication apparatus and the second terminal, and the application layer of the communication apparatus is a higher layer in a protocol stack of the communication apparatus than the RRC layer of the communication apparatus.

18. The medium according to claim 17, wherein the communication apparatus is further caused to perform:
disconnecting, on the RRC layer of the communication apparatus, an RRC connection between the communication apparatus and the second terminal, wherein
the first indication is an RRC connection disconnection indication, which indicates that the RRC connection between the communication apparatus and the second terminal is disconnected.

19. The medium according to claim 17, wherein the first indication is an integrity protection verification failure indication, which indicates that the integrity protection verification performed by the communication apparatus on the RRC message received from the second terminal fails.

* * * * *